Dec. 14, 1965    A. L. HUBBARD    3,222,821

COTTON PICKER SPINDLE SHARPENING DEVICE

Filed Nov. 3, 1961    2 Sheets-Sheet 1

INVENTOR.
A. L. HUBBARD

BY William A. Murray

ATTORNEY

Dec. 14, 1965  A. L. HUBBARD  3,222,821

COTTON PICKER SPINDLE SHARPENING DEVICE

Filed Nov. 3, 1961  2 Sheets-Sheet 2

INVENTOR.
A.L. HUBBARD
BY William A. Murray
ATTORNEY

United States Patent Office 3,222,821
Patented Dec. 14, 1965

3,222,821
COTTON PICKER SPINDLE SHARPENING
DEVICE
Arthur L. Hubbard, Des Moines, Iowa, assignor to Deere & Company, Moline, Ill., a corporation of Delaware
Filed Nov. 3, 1961, Ser. No. 150,018
5 Claims. (Cl. 51—92)

This invention relates to a device for resharpening the teeth or burrs of a conventional cotton picking spindle.

A standard type of cotton picker spindle presently in use consists of an elongated member formed about an axis with a gear formed at one end to denote a driven end and an opposite cone-shaped picking end. The teeth or burrs on the picker spindle are normally formed by providing a flat recessed surface on the conical end of the spindle and cutting a portion away from the surface axially along the cone so as to provide teeth. The teeth have front faces which extend from the surface of the cone to the flat surface with all the faces being in a common plane. The front face of each tooth forms with the outer surface of the cone a point which operates to snag or grip the cotton as it is passed through the cotton plant. It is this point that will in some instances and after considerable use become dull and consequently the effective harvesting of the spindle is somewhat reduced.

It is the primary purpose of this invention to provide a sharpening device which operates to cut off or grind the front surface of the row of teeth on the spindle so as to sharpen the points of each individual tooth or burr.

Specifically it is proposed to provide a pair of grinding wheels, one of which will sharpen teeth on a left-hand spindle and the other of which will sharpen the teeth on the right-hand spindle. The device includes a jig with a member thereon having conical recessed cavities for accommodating the conical ends of the spindles. The jig also includes an abutment which contacts the driving or gear ends of the spindles and holds the spindles in the conical cavities. Each cavity has an axially extending slot for exposing a row of teeth on a portion of the spindle. The entire jig is mounted on a carriage which slides under the two grinding wheels so that the front surface of each tooth is reground.

Figures 1, 2:
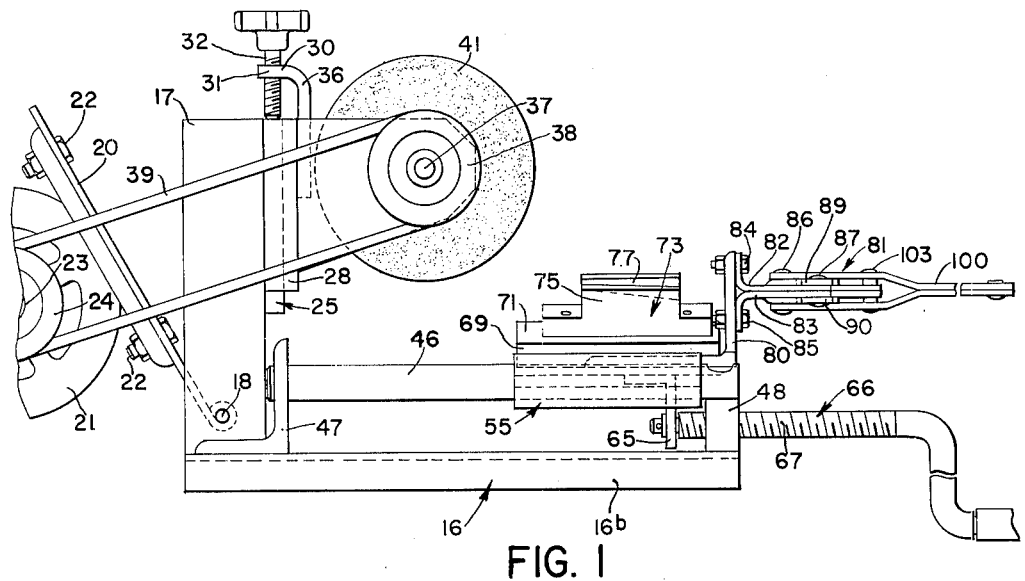
Figure 3:
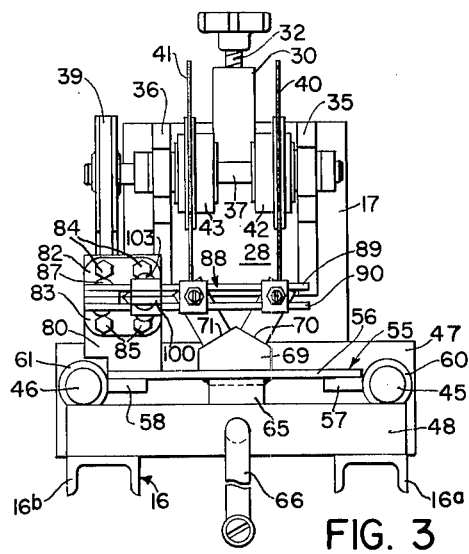
Figure 6:
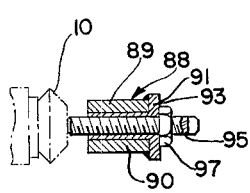
Figure 4:
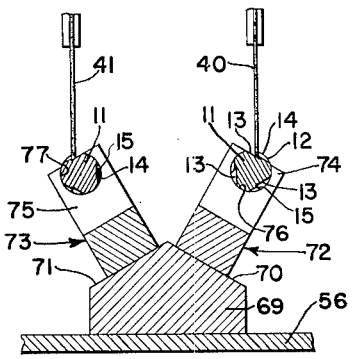
Figure 7:
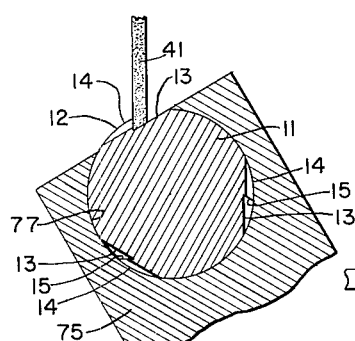
Figure 5:
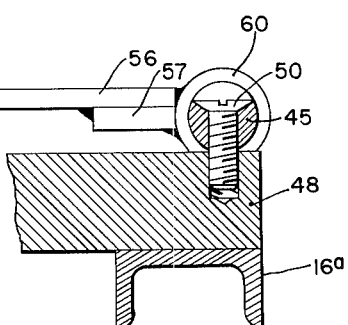

Other objects and advantages of the present invention will become apparent to those skilled in the art as the nature of the invention is better understood from the following description and as shown in the accompanying drawings:

FIG. 1 is a side view of the spindle sharpening device.
FIG. 2 is a plan view of the device shown in FIG. 1.
FIG. 3 is a view taken from one end of the device.
FIG. 4 is a sectional view taken substantially along the lines 4—4 of FIG. 2.
FIG. 5 is an enlarged sectional view taken substantially along the line 5—5 of FIG. 2.
FIG. 6 is an enlarged sectional view taken substantially along the line 6—6 of FIG. 2.
FIG. 7 is an enlarged cross section of the picking end of a spindle.

The picker spindle herein to be described may be of the type shown and described in detail in U.S. Patent 2,504,723 which issued to Mr. L. A. Paradise, April 18, 1950, or it may be of any of the series of conventional types presently on the market. The spindle is composed of a driven end 10 and a picking end 11, both of which are formed about an axis. The picking end 11 normally has a conical outer surface 12 with a series of three recessed flat faces 13. The teeth or barbs 14 are axially spaced along the conical ends and have front faces 15 extending from the conical outer surface to substantially the flat faces 13. The front faces 15 of the teeth 14 are normally disposed in a common plane running lengthwise of the picker spindle. The faces 15 extend from the conical surface to the flat faces 13 and form with the conical surface 12 picking points on the teeth 14. It is generally the degree of aggressiveness of the latter points which determines the ability of the picking spindle to grasp or snag onto the ripe cotton bolls in a cotton plant. Normally, after a degree of use by the spindles, these points will become rounded and somewhat dull. Therefore it is desirable to either replace the picker spindles or to sharpen the teeth on the spindles. It is the latter function that the device of the present invention is suited.

The grinding or sharpening device is composed of a longitudinal main frame 16 composed of a pair of transversely spaced channels 16a, and 16b and an upright U-shaped section 17 at one end thereof. The flanges of the U-shaped beam 17 have alined openings receiving a transverse horizontal pivot pin 18. Pivotally mounted on the pin 18 is an upwardly inclined plate 20 having secured to its forward face an electric motor, indicated in its entirety by the reference numeral 21. Bolt and nut combination 22 is provided for securing the motor 21 to the plate 20. The motor 21 has a shaft 23 with a V-belt pulley 24 attached thereto. Fixed to the front transverse face of the beam 17 is a vertical track 25 having opposite upright beveled edges 26, 27. A U-shaped guide 28 extends around and is held on the member 25 by accommodating internal beveled edges that contact the edges 26, 27. The guide 28 is free to move, unless otherwise restricted vertically along the track 25. An L-shaped bracket 30 is fixed to the front surface of the guide 28 with the leg 31 of the L-shaped bracket extending above and overlying the upper edge of the track 25. An adjusting screw 32 extends through the leg 31 and bears against the top edge of the track 25. By adjusting the screw 32, the vertical position of the guide 28 may be adjusted.

Extending forwardly from opposite edges of the guide members 28 is a pair of supporting elements 35, 36 the ends of which support a transverse driven shaft 37 by suitable bearings, not shown. A belt pulley 38 is provided on the outer end of the shaft 37 and is in general fore and aft or longitudinal alinement with the pulley 24. A V-belt 39 interconnects the two pulleys 24 and 38 and the shaft 37 is driven by the motor 21. Supported on the transverse shaft 37 is a pair of grinding disks or wheels 40, 41 held in position on the shaft 37 by means of hub structures 42, 43 respectively. The disks 40, 41 are in upright position and disposed in a longitudinal direction as respects the main frame 16.

The main frame 16 also has secured thereto a pair of transversely spaced guides or rods 45, 46. The guide rods 45, 46 are carried on the main frame 16 at one end by an angle iron 47 extending transversely between frame beams 16a, 16b and having a pair of holes or openings for receiving the ends of the rods 45, 46. A transverse member 48 is fixed to the opposite end of the frame 16. The ends of the rods 45, 46 rest upon the upper edge of the transverse member 48 in a manner shown in FIG. 5 relative to guiderod 45. The ends of the guide rods 45, 46 are recessed and are tapped to receive bolts 50 extending through the rods 45, 46 and into the member 48. The carriage 55 is supported on the guide rods 45, 46 and is composed of a carriage plate 56 disposed horizontally and having its outer edges reenforced by longitudinally extending metal straps 57, 58 welded to tubes or pipe sections 60, 61, the latter being carried on the guide rods 45, 46. Welded to the under side of the carriage plate 56 and centrally located between the rods 45, 46 is an angle iron metal strip 65 having a laterally extending flange welded to the aforesaid under side and a vertically disposed flange depending from the under side. The depending flange has an opening therein receiving the outer end of an adjusting crank shaft 66 threaded at 67. The transverse structural member 48 has a tapped opening for receiving the threaded section 67. Consequently as the crank member 66 is rotated, it will bear against the portion 65 which in turn will move the carriage structure toward or away from the under sides of the disks 40, 41.

Fixed to the top surface of the carriage plate 56 is a jig support 69 having a pair of inclined surfaces 70, 71 on which is carried a pair of jig fixtures 72, 73. The fixtures 72, 73 have upwardly projecting portions 74, 75 which have longitudinally extending and conical shaped cavities 76, 77. The cavities 76, 77 accommodate or receive the conical shaped ends of the cotton picking spindle. The cavities 76, 77 are open at the top to expose a row of teeth on the spindles which will normally rest or be seated in the cavities 76, 77. The cavities 76, 77 are normally disposed so that spindles resting in the cavities will have the flat recessed surfaces 13 below the under side of the disks 40, 41 and in a manner tangential thereto. Also, the axis of the cavities 76, 77 are such that the front faces 15 of the teeth of the spindles will lie in a plane substantially parallel to the side of the disks 40, 41. In this respect, it should be recognized that the cavities 76, 77 as well as the fixtures 72, 73 are disposed to receive spindles which will normally be positioned on both the left or right hand of the picker. Spindles, depending upon the position in the cotton harvester, will have what is generally known in the trade as either a left- or a right-hand series of threads. In the particular device here shown, the disk 40 and its respective fixture 72 is capable of grinding the front faces of the teeth of one type of spindle whereas the disk 41 and its jig or fixture 73 is capable of sharpening the front faces on the teeth on the other type of spindle.

Supported on one end of the carriage plate 56 is an L-shaped bracket 80 having a horizontal flange fixed to the top surface of the plate 56 and an upwardly projecting flange adjacent the edge of the plate 56. Supported on the outer flange is a lever structure indicated in its entirety by the reference numeral 81, composed of lever mounting plates 82, 83 having vertical flanges bolted at 84, 85 to the vertical flange of the bracket 80. The lever structure 81 has a pair of laterally disposed and forwardly projecting portions which carry an inner vertical pivot pin 86 and an outer vertical pivot pin 87. Supported on the outer pin 87 is a lever 88 composed of upper and lower metal straps 89, 90 respectively. The straps 89, 90 are spaced apart and have a pair of spacer elements 91, 92 extending therethrough. The spacer elements 91, 92 have flanges 93, 94 respectively which are welded to the plates 89, 90 and rigidly hold the plates in a spaced and fixed relation to one another. The spacers 91, 92 also have central tapped openings receiving threaded studs 95, 96 respectively. Lock nuts 97, 98 are provided on the studs 95, 96 and bear against the flanges 93, 94 of the spacers 91, 92. The lever 88 may, therefore, swing from an outer position shown in dotted representation in FIG. 2 to a position directly rearwardly of the drive ends 10 of the picker spindles. The ends of the studs 95, 96 will contact the ends of the spindles and cause the cone-shaped ends 11 of the spindles to be seated in the cavities of the fixtures 72, 73.

Means for locking the lever 88 in its closed position is provided by an arm 100 carried on the vertical pivot pin 86. The arm 100 and lever 88 are interconnected by a link 101 by means of vertical pivot pins 102, 103 respectively. The relationship of the pins 86, 87, 102, 103 as well as the length of the links 101 is such that the lever 88 will be held in a locked position by an over-center locking system of the entire lever structure 81 when it abuts the spindles in the jig. Consequently when the lever 88 is in a position in which the studs 95, 96 extend into and contact the driven ends 10 of the spindles, the entire spindle will be held in a fixed position relative to the fixtures 72, 73.

In operation, the spindles are placed in the cavities of the fixtures 72, 73 and are locked in place by the member 88. The teeth 14 are positioned so that the front face of the teeth, i.e. the face which extends from the outer conical surface 12 of the spindle to the inner flat face 13 will contact the side of the grinding wheels 40, 41. The entire fixture is carried upon the carriage 55 and the carriage is moved relative to the frame 16 by rotating the crank 66 through the end 48 of the frame 16. In doing this, the fixture and the spindles in the fixture are moved to the under side of the grinding disks 40, 41 and the faces 15 of the picking teeth lip are ground or sharpened.

While only one form of the invention has been shown, it should be recognized that other forms and variations will occur to those skilled in the art. Therefore it should be understood that while the disclosure was set forth in detailed manner for the purpose of clearly and concisely illustrating the principles of the invention, it was not intended to limit or narrow the invention beyond the broad concept set forth in the appended claims.

What is claimed is:

1. A tool for sharpening cotton picker spindles, the spindles being of the type having a driven end and a picking end, the latter having a cone-shaped surface, an axially extending flat face recessed from the surface, and a plurality of axially spaced teeth having front faces lying in a common plane and extending inwardly from the cone-shaped surface to the flat face and defining with the cone-shaped surface a series of alined picking points, the tool comprising: a frame; a grinding wheel rotatably supported on the frame; a pair of guides on the frame transversely disposed in respect to the axis of the grinding wheel and lying in a plane parallel to the axis; a carriage supported on the guides for movement toward or away from the grinding wheel; a jig secured to the carriage including a member having a cone-shaped cavity for accommodating the cone end of a spindle and a radial slot in the member for exposing teeth on a spindle, the axis of the cavity being substantially at right angle to the axis of the grinding wheel and so disposed that the flat face of a spindle will lie in a plane substantially tangential to the grinding wheel, said jig further having a lever with an abutment thereon for contacting the driven end of a spindle and effective to hold the spindle in the jig; and means moving the carriage on the guides whereby the grinding wheel may contact a spindle in the jig to effect grinding of the front faces on the teeth.

2. A tool for sharpening cotton picker spindles, the spindles being of the type having a driven end and a picking end, the latter having a surface formed about an axis, an axially extending flat face recessed from the surface, and a plurality of axially spaced teeth having front faces lying in a common plane and extending inwardly from the surface to the flat face and defining with the surface a series of alined picking points, the tool comprising: a frame; a grinding wheel rotatably supported on the frame; guide means on the frame transversely disposed in respect to the axis of the grinding wheel and lying in a plane parallel to the axis; a carriage supported on the guide means for movement toward or away from the grinding wheel; a jig structure secured to the carriage and having a portion with a conical cavity for accommodating the picking end of the spindle with a slot therein exposing the teeth on the spindle, and disposed so that the flat face of the spindle will lie in a plane tangential to an arc formed by a radius struck from the axis of the grinding wheel, said jig structure further having an abutment member adapted to engage the driven end of the spindle for retaining the spindle end in the cavity; and means moving the carriage on the guide means whereby the grinding wheel may contact the spindle in the jig structure to effect grinding of the front faces of the teeth.

3. The invention defined in claim 2 further characterized by means adjusting the position of the grinding wheel in relation to the flat face of the spindle to effect the depth of cut of the grinding wheel.

4. A cotton picker spindle sharpener comprising,
   (a) a holder adapted to receive a spindle to be sharpened and having a tapered recess therein which corresponds generally to the outer surface of the spindle to be sharpened,
   (b) there being an outwardly opening, longitudinally extending slot in said holder extending from the exterior of the holder to said tapered recess therein in position to expose a longitudinally extending portion of the spindle to be sharpened,
   (c) means to lock a spindle to be sharpened in said recess to retain the spindle in a predetermined fixed position relative to said holder,
   (d) a rotary sharpening tool in alignment with said longitudinally extending slot and disposed to make a longitudinally extending cut in a spindle to sharpened while the spindle is locked within said holder,
   (e) means holding said sharpening tool and said holder at selected positions relative to each other to place said sharpening tool in longitudinal alignment with said longitudinally extending slot, and
   (f) means to impart relative movement between said holder and said sharpening tool to thereby make said longitudinally extending cut in a spindle to be sharpened.

5. A cotton picker spindle sharpener as defined in claim 4 in which the position of the holder relative to the sharpened tool is adjustable whereby the undercut made by the sharpening tool may be varied.

References Cited by the Examiner
UNITED STATES PATENTS

| | | | |
|---|---|---|---|
| 667,321 | 2/1901 | Keyes | 51—225 X |
| 983,993 | 2/1911 | Graef | 51—225 X |
| 988,577 | 4/1911 | Knapp | 51—92 |

LESTER M. SWINGLE, *Primary Examiner.*

FRANK E. BAILEY, FRANK H. BRONAUGH, J. SPENCER OVERHOLSER, *Examiners.*